(12) United States Patent
Yamaguchi et al.

(10) Patent No.: US 9,481,049 B2
(45) Date of Patent: Nov. 1, 2016

(54) COMBINED MACHINING METHOD AND COMBINED MACHINING DEVICE

(71) Applicant: KOMATSU INDUSTRIES CORPORATION, Kanazawa-shi, Ishikawa (JP)

(72) Inventors: Yoshihiro Yamaguchi, Kaga (JP); Kazuyuki Kitamura, Komatsu (JP); Keita Kondo, Komatsu (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 230 days.

(21) Appl. No.: 14/374,401

(22) PCT Filed: Feb. 18, 2013

(86) PCT No.: PCT/JP2013/053818
§ 371 (c)(1),
(2) Date: Jul. 24, 2014

(87) PCT Pub. No.: WO2013/145929
PCT Pub. Date: Oct. 3, 2013

(65) Prior Publication Data
US 2015/0027999 A1    Jan. 29, 2015

(30) Foreign Application Priority Data

Mar. 28, 2012   (JP) ................................ 2012-073222

(51) Int. Cl.
*B23K 10/00*         (2006.01)
*B23P 23/04*         (2006.01)
(Continued)

(52) U.S. Cl.
CPC ................. *B23K 10/00* (2013.01); *B23C 3/12* (2013.01); *B23K 9/126* (2013.01); *B23K 37/08* (2013.01); *B23P 23/04* (2013.01)

(58) Field of Classification Search
CPC .... B23K 10/00; B23K 10/006; B23K 9/126; B23K 37/08; B23K 37/027; B23P 23/04; B23C 3/12; B23C 2220/24; B23C 2220/20; H05H 1/36; H05H 1/26

USPC ........... 219/121.39, 121.44, 121.54, 121.59, 219/121, 58
See application file for complete search history.

(56) References Cited

U.S. PATENT DOCUMENTS 4,859,828 A      8/1989   Zumstein
5,218,181 A *    6/1993   Shintani ................. B23K 10/00
                                                  219/121.39

(Continued)

FOREIGN PATENT DOCUMENTS

CN       1486817 A      4/2004
CN    101001713 A       7/2007

(Continued)

OTHER PUBLICATIONS

The Office Action for the corresponding Chinese application No. 201380006163.4, issued on Nov. 3, 2015.

(Continued)

*Primary Examiner* — Mark Paschall
(74) *Attorney, Agent, or Firm* — Global IP Counselors, LLP

(57) ABSTRACT

A method of cutting a cut member out of an original sheet by means of thermal cutting and machining, and includes a hole-cutting process, a finishing process, and an outer periphery-cutting process. During the hole-cutting process, a hole is created in the original sheet by means of thermal cutting while leaving a machining allowance in addition to the finished size of the hole. During the finishing process, a cutting tool is inserted into the hole which has been created through the hole-cutting process, and the cutting tool is guided along the inner circumference of the hole so as to cut the thermally-cut end surface in order to machine the hole to the finished size. During the outer periphery-cutting process, the outer periphery of the cut member is cut by means of thermal cutting to take the cut member out of the original sheet.

14 Claims, 11 Drawing Sheets

(51) Int. Cl.
*B23K 9/12* (2006.01)
*B23C 3/12* (2006.01)
*B23K 37/08* (2006.01)

(56) References Cited

U.S. PATENT DOCUMENTS

| | | | | |
|---|---|---|---|---|
| 6,028,283 | A * | 2/2000 | Brunken, Sr. | B21C 37/08 219/123 |
| 6,236,013 | B1 * | 5/2001 | Delzenne | B23K 10/00 219/121.37 |
| 8,204,618 | B2 * | 6/2012 | Young, Jr. | B23K 31/10 219/121.39 |
| 8,683,841 | B1 * | 4/2014 | Walsh | B21C 37/122 219/121.36 |
| 2002/0151420 | A1 * | 10/2002 | Scott | B23K 26/10 483/29 |
| 2004/0104203 | A1 | 6/2004 | Yamaguchi et al. | |
| 2005/0022382 | A1 * | 2/2005 | Bruck | F01N 3/281 29/890 |
| 2005/0035093 | A1 * | 2/2005 | Yamaguchi | B23K 10/006 219/121.39 |
| 2007/0241083 | A1 * | 10/2007 | Yamaguchi | B23K 10/006 219/121.39 |
| 2008/0314875 | A1 * | 12/2008 | Yamaguchi | B23K 7/002 219/68 |
| 2010/0155377 | A1 * | 6/2010 | Lindsay | B23K 31/10 219/121.44 |
| 2012/0018409 | A1 * | 1/2012 | Lindsay | B23K 10/00 219/121.44 |

FOREIGN PATENT DOCUMENTS

| | | |
|---|---|---|
| CN | 201371361 Y | 12/2009 |
| JP | 59-196115 A | 11/1984 |
| JP | 63-120045 A | 5/1988 |
| JP | 63-134143 A | 6/1988 |
| JP | 63-180390 A | 7/1988 |
| JP | 3-47749 U | 5/1991 |
| JP | 5-104365 A | 4/1993 |
| JP | 5-116010 A | 5/1993 |
| JP | 5-261610 A | 10/1993 |
| JP | 5-318156 A | 12/1993 |
| JP | 9-216021 A | 8/1997 |
| JP | 2000-33490 A | 2/2000 |
| JP | 2000-326159 A | 11/2000 |
| JP | 3438848 B2 | 8/2003 |
| JP | 2007-125567 A | 5/2007 |
| KR | 10-2007-0022342 A | 2/2007 |

OTHER PUBLICATIONS

The International Search Report for the corresponding international application No. PCT/JP2013/053818, issued on May 21, 2013.
The Office Action for the corresponding Korean application No. 10-2014-7020009, issued on Oct. 8, 2015.

* cited by examiner (a)

(b)

(a)

(b)

(a)

(b)

COMBINED MACHINING METHOD AND COMBINED MACHINING DEVICE

CROSS-REFERENCE TO RELATED APPLICATIONS

This application is a U.S. National stage application of International Application No. PCT/JP2013/053818, filed on Feb. 18, 2013. This U.S. National stage application claims priority under 35 U.S.C. §119(a) to Japanese Patent Application No. 2012-073222, filed in Japan on Mar. 28, 2012, the entire contents of which are hereby incorporated herein by reference.

BACKGROUND

1. Field of the Invention

The present invention relates to a combined machining method and in particular to a combined machining method involving forming a hole in an original sheet by means of thermal cutting and machining, and removing a cut member including the hole from the original sheet.

The present invention further relates to a combined machining device for implementing the above combined machining method.

2. Background Information

Welded structures for configuring main body frames for bridges, construction machinery, and industrial machinery and the like are obtained by taking out cut members of various shapes from an original sheet. Thermal cutting, such as plasma cutting, gas cutting, or laser cutting that is programmed to make a cut of any shape, is used when taking out this type of cut member.

Japanese Laid-Open Patent Publication No. S59-196115 discloses a combined machining device equipped with a machining head onto which a cutting tool, such as a drill or and end mill, can be mounted, the machining head being different from a machining head for thermal cutting having installed thereon a plasma torch, a gas torch, or a laser head and the like. In addition to thermal cutting, this type of combined machining device is used for machining complex precision holes which cannot be processed by thermal cutting, holes which are determined according to standards for machining, such as holes for joints in steel frames for construction, or grooves and the like for welding.

Japanese Laid-open Patent Publication No. H09-216021 also discloses a combined machining device having a punch machining head and a laser machining head. This device forms pilot holes in a plate by means of the laser machining head and then performs finishing on the pilot hole by means of the punch machining head.

SUMMARY

To perform machining, such as cutting machining, with high efficiency, the combined machining device requires a high-output motor and a high rigidity frame for bearing a large machining reaction force. The combined machining device is also provided with a clamping mechanism for securing the original sheet on a loading table to limit movement and vibration of the original sheet due to the reaction forces during machining. Therefore, the manufacturing cost of the device is very high.

When forming a hole in an original sheet by means of drilling, the clamping mechanism can be omitted as disclosed in Japanese Laid-Open Patent Publication No. S59-196115. That is, movement and vibration of the original sheet are prevented by the provision on the machining head of a mechanism for pressing down the original sheet, because the machining head having the drill tool mounted thereon moves in the vertical direction during machining. Moreover, the above mechanism can be achieved with a simple configuration.

However, in another type of machining, such as end mill machining, the machining head must move in a horizontal direction and thus the machining head cannot be equipped with a mechanism to press down the original sheet. Further, while drill machining does not exert a force in the horizontal direction, end mill machining does exert a force in the horizontal direction. Therefore, end mill machining requires more rigidity of the machine main body than drill machining does and in addition, a strong clamping mechanism is needed to suppress movement of the original sheet in the horizontal direction. As a result, a combined machining device for performing various types of machining, such as drill machining and end mill machining, is provided with a separate large clamping mechanism as disclosed in Japanese Laid-Open Patent Publication No. S59-196115.

A device having a head for drill machining provided in juxtaposition with a thermal cutting device is able to forgo a large clamping mechanism as described above. However, multiple drill tools having corresponding diameters need to be prepared to form holes with various diameters and thus an automatic tool changer (ATC) is required. As a result, the expense of the entire device increases.

The device in Japanese Laid-open Patent Publication No. H09-216021 requires punches corresponding to various types of hole diameters and thus this device also requires an automatic tool changer. Therefore, the manufacturing cost of the device is similarly very high.

Problems of the conventional combined machining devices having a machining head for thermal cutting and a machining head for machining in addition to the above problems are described below.

A machine main body for holding the machining heads requires high rigidity due to a machining reaction force from a large amount of cutting due to the machining. Moreover, the provision of a clamping mechanism for clamping the original sheet to the loading table or of a mechanism for pressing down the original sheet onto the loading table is required, and the machining equipment becomes more complex, which raises costs.

An ATC is required for drill machining and the costs of the machining equipment increases.

Because the cutting amount during machining is large in a conventional combined machining apparatus, relatively large thread-like or spiral chips are produced even though the clearance (cutting height) between the plasma torch and the original sheet for example is several millimeters. These chips become scattered over the original sheet and hinder the travel of the torches during thermal cutting. In particular, needle-shaped thread-like or spiral chips cannot be blown away with gas or removed by a brush when the chips become caught in grooves cut in the thermal cutting.

Because the cutting amount during machining is large in the conventional combined machining apparatus, the machining speed is slower than the thermal cutting and overall productivity is reduced due to the combined machining.

When machining a large original sheet, the original sheet needs to be carried onto the loading table with a crane and then needs to be positioned with respect to the clamping mechanism with the crane. It is not practical to perform positioning of the original sheet by means of a crane in this way.

A combined machining apparatus that is able to perform both thermal cutting and machining cannot be used for the purpose of removing a large cut member from a large original sheet (e.g., an original sheet with a length exceeding 6 m) used in bridges, construction machinery or industrial machinery even when applied to a relatively small original sheet that can be clamped in a simple manner, due to the above problems.

Particular reasons for the impracticability of a combined machining apparatus with end mill machining and thermal cutting machinery are described below.

The original sheet cannot be secured by a clamping mechanism on the loading table by merely placing the original sheet on the loading table in a thermal cutting machine. That is, a clamping mechanism is not provided from the operation itself for removing a plurality of cut members from a large original sheet, and moreover, a load in the horizontal direction is not exerted on the original sheet when performing thermal cutting operations. Moreover, one reason that the clamping mechanism is not provided is that the position of a large original sheet on the loading table is not very precise because the original sheets are replaced by using a crane in operations to replace the original sheets.

Accordingly, when performing drill machining or punch press machining, while a mechanism for pressing the original sheet may be provided around a drill or a punch mold, a simple mechanism for pressing the original sheet cannot be provided when performing end mill machining as described above because the tool itself moves in the horizontal direction. Furthermore, a machining load in the horizontal direction is produced during end mill machining.

As described above, the conditions required for the operation characteristics for end mill machining and thermal cutting machining are different, and therefore a combined machining apparatus with end mill machining equipment and thermal cutting equipment that does not have a clamping mechanism is not practical.

An object of the present invention is to enable thermal cutting and machining to be performed on large original sheets in particular by means of a simple and inexpensive combined machining device.

A combined machining method according to a first aspect of the present invention is a method for forming a hole in an original sheet by means of thermal cutting and machining and taking out a cut member including the hole from the original sheet. The method includes a hole-cutting process, a finishing process, and an outer periphery-cutting process. During the hole-cutting process, a hole is formed in the original sheet by means of thermal cutting while leaving a machining allowance relative to a finished size of the hole. During the finishing process, a cutting tool is inserted into the hole which has been formed in the hole-cutting process, and the cutting tool is guided along the inner peripheral surface of the hole to cut the thermally-cut end surface, and machining the hole to the finished size. During the outer periphery-cutting process, the outer periphery of the cut member is cut by means of thermal cutting to take the cut member out of the original sheet. Furthermore, a confirmation process for confirming whether or not thermally-cut end material is remaining inside the hole from the hole-cutting process is included between the hole-cutting process and the finishing process.

When a plurality of cut members are present, the machining may be performed in the following order.

Processes of hole-cutting » finishing » outer periphery-cutting are implemented in order for each cut member.

The processes of hole-cutting » finishing are implemented altogether on the plurality of cut members, and next the outer periphery-cutting is implemented altogether on the plurality of cut members.

After the hole-cutting is repeated and the finishing machining is repeated, the outer periphery-cutting is implemented altogether.

As can be seen from the above description, the outer periphery-cutting process is necessarily implemented after the finishing process. That is, the point in time for implementing the finishing machining is before the outer periphery-cutting, and the cut members need to be united with the original sheet.

In the machining method described above, a small machining allowance remains during the formation of the hole by thermal cutting in the hole-cutting process, whereby a load during the cutting machining can be reduced in the finishing process. As a result, the rigidity of the frame in a device for implementing the machining method can be reduced and a motor for the machining can be made more compact in comparison to the conventional means. Furthermore, at the point in time of implementing the finishing machining of the hole by means of the machining, the cut member including the hole section when performing the finishing machining is not cut away from the original sheet because the finishing machining is before the outer periphery-cutting process. As a result, the original sheet is held on the loading table due to the dead weight of the original sheet when the original sheet is particularly large and the machining allowance and the diameter of the cutting tool can be set appropriately, whereby movement of the original sheet due to a machining reaction force can be prevented even without clamping.

When executing hole cutting, end material of an inside section of the hole normally falls downward from gaps between the crosspieces of the table. However, when the hole cutting is implemented when straddling a crosspiece, the end material remains on the crosspiece and may remain in the hole due to the end material catching onto the inner peripheral surface of the hole. In such a condition, the tool for cutting in the finishing process cannot be inserted into the inside section of the hole. Thus, confirming whether or not end material is remaining in the inside section of the cut hole is performed in this method. When end material is remaining, the finishing process is not executed or processing is executed so that the finishing process is executed after the end material is removed.

A combined machining method according to a second aspect of the present invention is related to the method of the first aspect, wherein the thermal cutting during the hole-cutting process and the outer periphery-cutting process is plasma cutting that generates a plasma arc on the front surface side of the original sheet, and the hole-cutting process involves thermal cutting so that a machining allowance remains on an original sheet front surface side end section of the hole.

When forming a hole by plasma cutting, the diameter of the original sheet front surface side of the hole that is the side that the plasma arc makes contact with tends to be larger than the diameter on the rear surface side.

Accordingly, the method according to the second aspect involves thermal cutting so that the machining allowance remains in the original sheet front surface side end section of the hole in the hole-cutting process. In this case, by making a target size on the hole front surface side the approximate finished size in the hole-cutting process, the cutting amount in the finishing process can be greatly reduced.

A combined machining method according to a third aspect of the present invention is related to the method of the first aspect, wherein the thermal cutting during the hole-cutting process and the outer periphery-cutting process is laser cutting that irradiates a laser or gas cutting that emits a gas from the front surface of the original sheet, and the hole-cutting process involves thermal cutting so that a machining allowance remains on an original sheet rear surface side end section of the hole.

When forming a hole by means of laser or gas cutting, the diameter on the original sheet front surface side of the hole which is the laser irradiation side or the gas emission side tends to be smaller than the diameter of the rear surface side, which is the reverse of the tendency in plasma cutting.

Accordingly, the method according to the third aspect involves thermal cutting so that the machining allowance remains in the original sheet rear surface side end section of the hole in the hole-cutting process. In this case, by making a target size on the hole rear surface side the approximate finished size in the hole-cutting process, the cutting amount in the finishing process can be greatly reduced.

A combined machining method according to a fourth aspect of the present invention is related to any of the first to third aspects, wherein machining from the hole-cutting process to the outer periphery-cutting process is performed without clamping the original sheet.

As described above, the machining reaction force exerted on the original sheet during machining is reduced by implementing the method of the present invention. As a result, machining can be performed without clamping the original sheet.

A combined machining method according to a fifth aspect of the present invention is related to any of the first to fourth aspects, wherein the finishing process involves using a rotating cutting tool to cut the thermally-cut end surface of the hole. The cutting tool diameter is two times or less than the thickness of the original sheet.

Normally, an item with a large tool diameter is commonly used in a possible range because the cutting speed (tool diameter x spindle rotation speed) is increased and machining efficiency is improved correspondingly when a tool with a large tool diameter is used.

However, when performing machining without clamping the original sheet, a technique to prevent the original sheet from vibrating is required.

The deadweight of the original sheet increases as the plate thickness of the original sheet increases and, thus, a constraining force (holding force on loading table) increases. Therefore, there is a relationship between the plate thickness and the diameter of the cutting tool when performing machining without clamping the original sheet.

Based on results of machining testing by the inventors, when performing cutting machining without clamping the original sheet, it was found that, when the cutting tool diameter is made to be two times or less than the plate thickness, favorable finishing machining for various original sheets is made possible at a high machining speed within a range in which the original sheet does not vibrate nor move.

The lower limit of the cutting tool diameter is limited by the diameter of an attachment shaft. The attachment shaft diameter is determined on the basis of the strength that allows the attached cutting tool to function as a tool. Therefore, the cutting tool diameter is naturally equal to or greater than the diameter having the strength to function as the tool.

The diameter of the cutting tool is made to be two times or less than the thickness of the original sheet in the method according to the fifth aspect in this case. The cutting tool diameter is more preferably one time or less than the thickness of the original sheet.

A combined machining method according to a sixth aspect of the present invention is related to any of the first to fifth aspects, and further includes a measuring process for measuring a height position of the hole as a previous process of the finishing process. Moreover, the height position of the cutting tool is controlled in the finishing process on the basis of measurement results from the measuring process and plate thickness data of the original sheet.

The height of the original sheet placed on the loading table in the thermal cutting machine is not uniform due to dross adhered to crosspieces of the table and due to warping of the original sheet. The height of the upper surface of the crosspieces may have a variation of several millimeters since the crosspieces of the table are consumable goods.

When performing machining on the inner peripheral surface (cutting end surface) of the hole on the basis of data of a predetermined table surface height and the thickness of the original sheet under such conditions, an un-machined portion may remain near the bottom of the hole or conversely a crosspiece or dross may be cut. In this way, the machining speed needs to be reduced when it is assumed that the crosspiece or the dross may be cut, and furthermore the rigidity of the frame needs to be increased since the machining reaction force increases.

Accordingly, the height position of the hole is measured before the finishing process in the method according to the sixth aspect, and the height position of the cutting tool is controlled on the basis of the measurement results. As a result, the inner peripheral surface of the hole can be cut precisely.

The height position of the hole can be easily measured by measuring the front surface height of the original sheet near the hole.

A combined machining method according to a seventh aspect of the present invention is related to any of the first to sixth aspects, and further includes a confirmation process for confirming whether or not thermally-cut end material remains inside the hole in the hole-cutting process between the hole-cutting process and the finishing process.

When executing hole cutting, normally end material of an inside section of the hole falls downward from gaps between the crosspieces of the table. However, when the hole cutting is implemented when straddling a crosspiece, the end material remains on the crosspiece and may remain in the hole due to the end material catching onto the inner peripheral surface of the hole. In such a condition, the tool for cutting in the finishing process cannot be inserted into the inside section of the hole.

Accordingly, the method according to the seventh aspect involves confirming whether or not end material is remaining in the inside section of the cut hole. When end material is remaining, the finishing process is not executed or processing is executed so that the finishing process is executed after the end material is removed.

A combined machining method according to an eighth aspect of the present invention is related to the the method of the first to sixth aspects, wherein the confirmation process is performed by inserting the cutting tool used in the finishing process into the hole.

A special sensor is not required in this case because the presence of end material inside the hole is confirmed by means of the cutting tool used in the finishing process.

A combined machining method according to a ninth aspect of the present invention is related to any of the methods from the first to eighth aspects, wherein the finishing process involves cutting the thermally-cut end surface of the hole formed in the hole-cutting process with an end mill.

Because the cut end surface of the hole is cut by end-milling in this case, various hole diameters can be treated with one tool.

A combined machining method according to a tenth aspect of the present invention is related to any of the first to ninth aspects, wherein the finishing process involves driving the rotating cutting tool with an air motor.

By rotating the cutting tool with an air motor, number of tool rotations can be decreased when the machining load is increased. As a result, movement of the original sheet can be further suppressed.

A combined machining device according to an eleventh aspect of the present invention is a device for forming a hole in an original sheet by means of thermal cutting and machining and taking out a cut member including the hole from the original sheet, wherein the device comprises: a loading table on which the original sheet is loaded; a first head for performing thermal cutting on the original sheet in a state of not being clamped on the loading table; a second head for performing machining on the original sheet in a state of not being clamped on the loading table; a movement mechanism for moving the first and second heads in a horizontal direction and a vertical direction relative to the loading table, a height position detection sensor for detecting a vertical direction position of the original sheet loaded on the loading table; and a control unit for controlling relative movement of the first and second heads relative to the loading table and for controlling the thermal cutting and the machining by the first and second heads. The control unit has a hole-cutting functional unit, a finishing functional unit, and an outer periphery-cutting functional unit. The hole-cutting functional unit forms a hole in the original sheet by means of thermal cutting while leaving a machining allowance relative to the finished size of the hole. The finishing functional unit inserts a cutting tool into the hole which has been formed in the hole-cutting process, and guides the cutting tool along the inner peripheral surface of the hole to cut the thermally-cut end surface, and machining the hole to the finished size. The outer periphery-cutting functional unit cuts the outer periphery of the cut member by means of thermal cutting and taking out the cut member from of the original sheet. Furthermore, the control unit has a confirmation functional unit for confirming whether or not thermally-cut end material is remaining inside the hole.

In this combined processing device, a small machining allowance remains during the formation of the hole by thermal cutting in the hole-cutting process, whereby a load during the cutting machining can be reduced in the finishing process. As a result, the rigidity of the device frame for implementing the cutting machining can be reduced and a motor for the machining can be made more compact in comparison to the conventional means. Moreover, a clamping mechanism for pressing down the original sheet is unnecessary A combined machining device according to a twelfth aspect of the present invention is related to the device of the eleventh aspect, wherein the second head has a cutting tool having a diameter that is two times or less than the thickness of the original sheet.

As mentioned above, a reaction force exerted on a main shaft to which the tool is attached and on the original sheet decreases in correspondence to a reduction in the tool diameter. As a result, vibration during machining can be further suppressed due to the diameter of the cutting tool being two times or less than the thickness of the original sheet. The cutting tool diameter is more preferably one time or less than the thickness of the original sheet.

A combined machining device according to a thirteenth aspect of the present invention is related to the eleventh or twelfth aspect, wherein the control unit further includes a confirmation functional unit for confirming whether or not thermally-cut end material is remaining inside the hole.

A combined machining device according to a fourteenth aspect of the present invention is related to the device of the eleventh or twelfth aspect, wherein the control unit confirms the presence of the end material by inserting the cutting tool attached to the second head into the hole.

A combined machining device according to a fifteenth aspect of the present invention is related to the device of the eleventh to fourteenth aspects, wherein an end mill is attached to the second head.

A combined machining device according to a sixteenth aspect of the present invention is related to any of the eleventh to fifteenth aspects, wherein the second head has an air motor for driving the cutting tool.

By rotating the cutting tool with an air motor, the machining load can be increased and the tool rotation speed can be decreased. As a result, movement of the original sheet can be further suppressed.

According to the above aspects of the present invention, thermal cutting and machining to be performed especially on large original sheets is enabled by means of a simple and inexpensive combined machining device.

DESCRIPTION OF EXEMPLARY EMBODIMENTS

Configuration of Combined Machining Device

Figure 1:
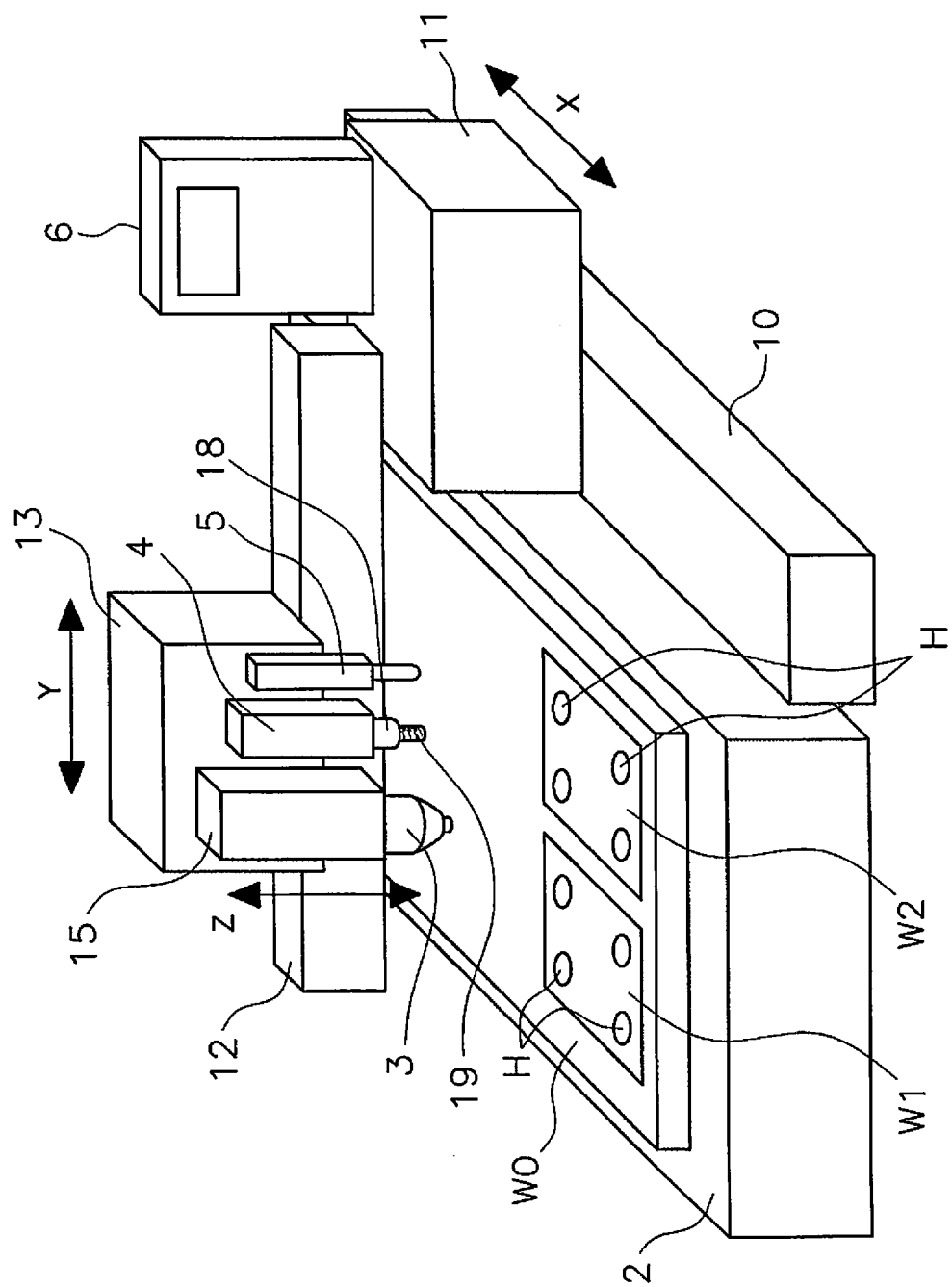
FIG. 1 is a view of an external configuration of a combined machining device according to a first exemplary embodiment of the present invention.
Figure 2:
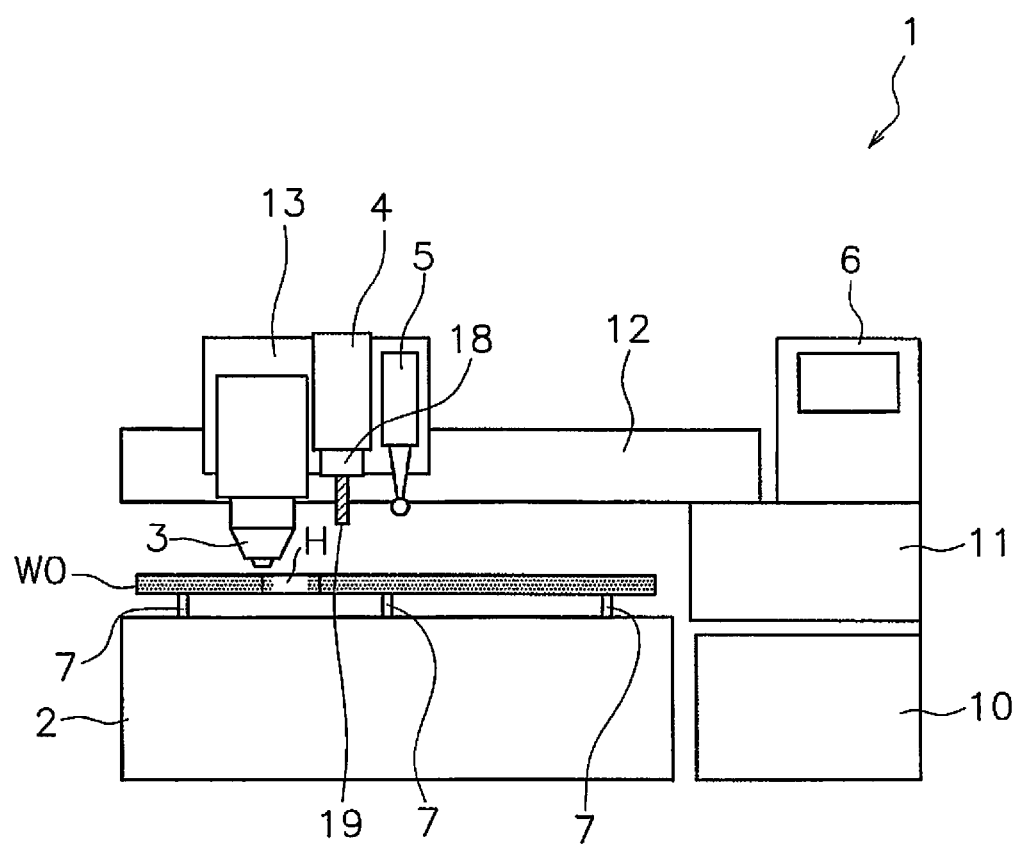
FIG. 2 is a front view of the combined machining device.

FIG. 1 illustrates an overall configuration of a combined machining device 1 according to a first exemplary embodiment of the present invention. FIG. 2 illustrates a front schematic view of the combined machining device 1.

The combined machining device 1 is provided with a loading table 2 on which a steel plate W0 that is an original sheet is loaded, a plasma torch (first head) 3 for thermal cutting, a head (second head) 4 for machining, a height detection sensor 5, and a controller 6.

The following is an explanation of taking out a plurality of cut members W1, W2, each having a hole H from the original sheet W0 by means of the combined machining device 1.

A plurality of crosspieces 7 are arranged on the top surface of the loading table 2 and processed end material is allowed to fall down from gaps between the crosspieces 7. The space above the loading table 2 is connected to a dust collector, which is not illustrated.

An X-axis rail 10 is arranged beside the loading table 2. The X-axis rail 10 supports an X-axis cart 11 in a manner that allows movement along the X-axis. A Y-axis arm 12 that extends in the Y-axis direction orthogonal to the X-axis direction is fixed to the X-axis cart 11. The Y-axis arm 12 is positioned above the loading table 2. A Y-axis cart 13 is supported on the Y-axis arm 12 in a manner that allows movement in the Y-axis direction. The X-axis cart 11 and the Y-axis cart 13 are respectively driven by an X-axis motor Mx and a Y-axis motor My which are illustrated in FIG. 3.

The plasma torch 3 is mounted to allow movement along the Z-axis direction (vertical direction) onto a Z-axis cart 15 supported on the Y-axis cart 13. A distal end part of the plasma torch 3 has a pointed and approximately cylindrical shape, and is connected to a plasma power supply unit 17 (see FIG. 3) via a torch cable and the like. A first Z-axis motor Mz1 illustrated in FIG. 3 is provided to allow the plasma torch 3 to be driven in the vertical direction.

Figure 3:
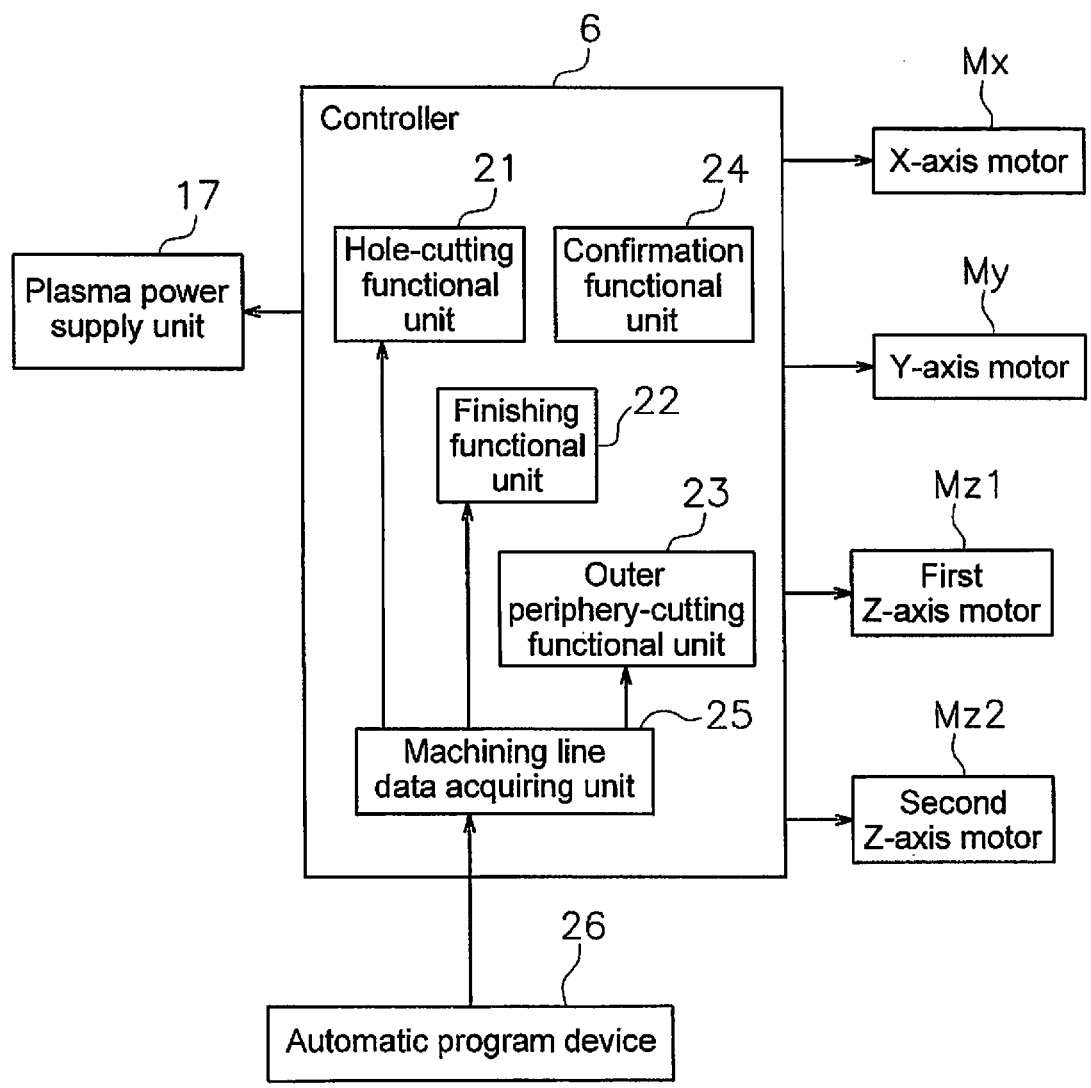
FIG. 3 is a system block diagram of the combined machining apparatus.

The machining head 4 has a second Z-axis motor Mz2 illustrated in FIG. 3 and a primary shaft 18 that is movable in the Z-axis direction, and an end mill 19 is mounted on the distal end of the primary shaft 18.

A roughing end mill for rough cutting that exerts a small reaction force when cutting so that the original sheet W0 is not easily moved during cutting, is used as the end mill 19 in this exemplary embodiment.

As mentioned above, based on results of machining testing by the inventors, when performing cutting machining without clamping the original sheet, it was found that, when the cutting tool diameter is made to be two times or less than the plate thickness, favorable finishing machining on various original sheets is made possible at a high machining speed within a range in which the original sheet does not vibrate nor move.

The diameter of the end mill 19 as a result is preferably two times or less than the plate thickness of the original sheet W0, or more preferably one time or less than the plate thickness of the original sheet W0.

An air motor is used as the second Z-axis motor Mz2 in this exemplary embodiment. When there is a large machining allowance and the load torque is high when using an electric motor, cutting machining is carried out without a reduction in rotation speed when there is an excess of motor capacity. As a result, there is a possibility that the original sheet W0 may move because the original sheet W0 is not clamped during cutting machining in accordance with the exemplary embodiments of the present invention.

Conversely, the rotation speed of the motor decreases when the load torque increases if the end mill 19 is driven by an air motor. Therefore, as mentioned above, cutting is performed at a low rotation speed without forcefully performing the cutting at a fixed rotation speed when there is a large machining allowance. As a result, movement of the original sheet W0 can be prevented and machining can be performed accurately without clamping the original sheet W0.

The height detection sensor 5 is supported on the Y-axis cart 13 and is movable in the Z-axis direction. The mechanism for driving the height detection sensor 5 in the vertical direction is omitted.

According to the above configuration, the plasma torch 3 and the machining head 4 are capable of being moved to any position in the horizontal direction (X- and Y-axis directions) and in the vertical direction (Z-axis direction) relative to the original sheet W0 loaded on the loading table 2. That is, a movement mechanism for moving the plasma torch 3 and the machining head 4 in each direction is configured by the motors Mx, My, Mz1, and Mz2 for respectively driving the X-axis cart 11, the Y-axis cart 13, the Z-axis cart 15, and the primary shaft 18.

As described below, the plasma torch 3 and the machining head 4 may be moved in the Z-axis direction by means of one motor for driving in the Z-axis direction and one air cylinder.

The controller 6 has a hole-cutting functional unit 21, a finishing functional unit 22, an outer periphery-cutting functional unit 23, a confirmation functional unit 24, and a machining line data acquiring unit 25 as illustrated in FIG. 3. The hole-cutting functional unit 21, the finishing functional unit 22, the outer periphery-cutting functional unit 23, and the confirmation functional unit 24 are configured by a program.

The hole-cutting functional unit 21 has the function of forming a hole in the original sheet by means of plasma cutting while leaving a machining allowance relative to the finished size. The finishing functional unit 22 has the function of machining the hole to the finished size by inserting the end mill 19 into the hole formed by the hole-cutting functional unit 21 and cutting a thermally-cut end surface by guiding the end mill 19 along the inner peripheral surface of the hole. The outer periphery-cutting functional unit 23 has the function of forming a cutting groove around the outer periphery of a cut member by means of plasma cutting and removing the cut member from the original sheet W0. The confirmation functional unit 24 has the function of confirming whether any end material that is plasma-cut by means of the hole-cutting functional unit 21 remains inside the hole.

The controller 6 is connected to an automatic program device 26. The automatic program device 26 programs the data of the machining line in accordance with the shape of the cut member. The machining data programmed by the automatic program device 26 is transmitted to the machining line data acquiring unit 25 of the controller 6.

The height detection sensor 5 and the motors Mx, My, Mz1, and Mz2 for respectively driving the movable carts 11, 13, and 15 and the primary shaft 18 in the axial directions, are connected to the controller 6. The plasma power supply unit 17 is connected to the controller 6 whereby the generation of a plasma arc is controlled.

Machining Method

Figure 4:
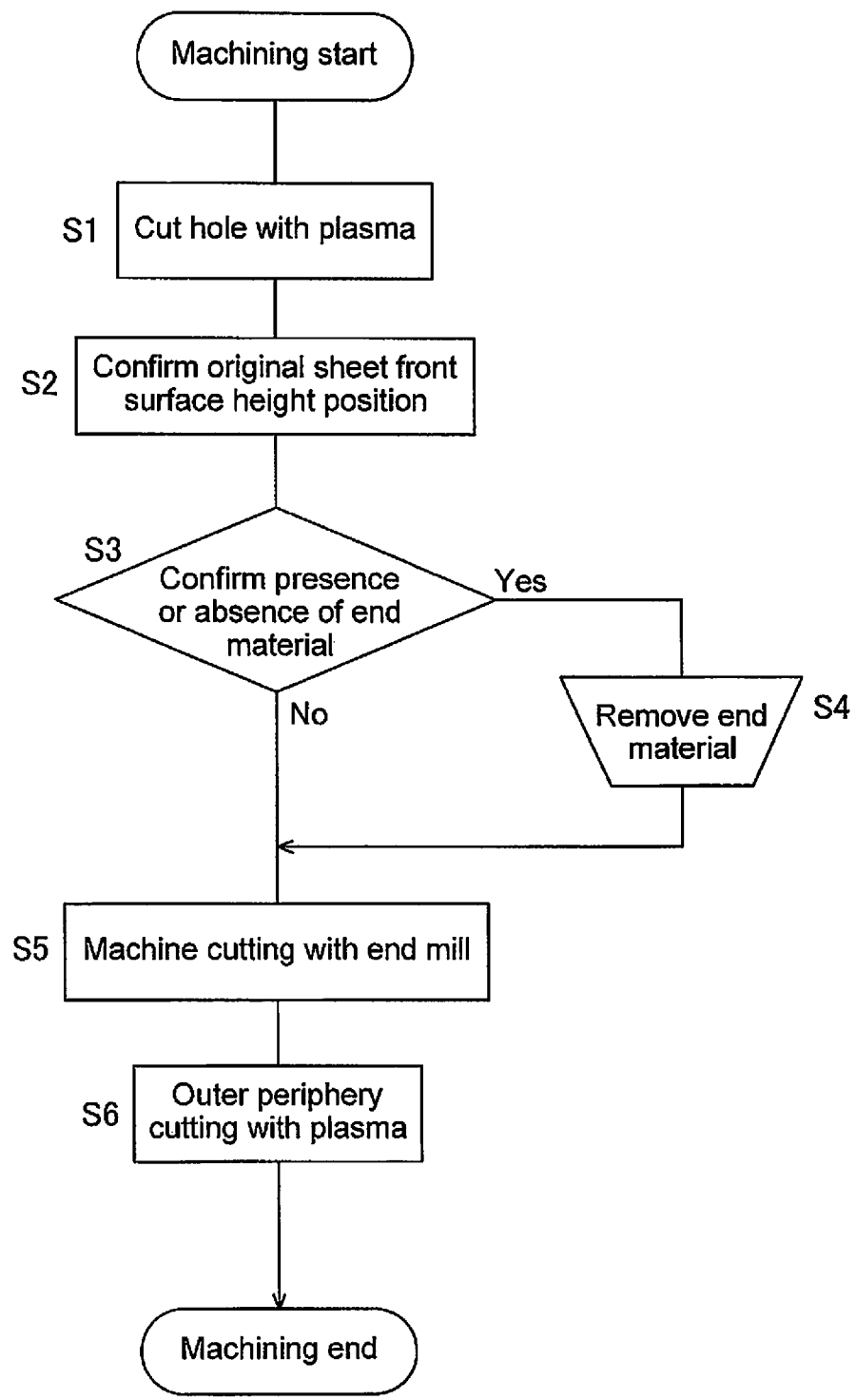
FIG. 4 illustrates operating procedures of a combined machining method according to the first exemplary embodiment of the present invention.
Figure 5A:
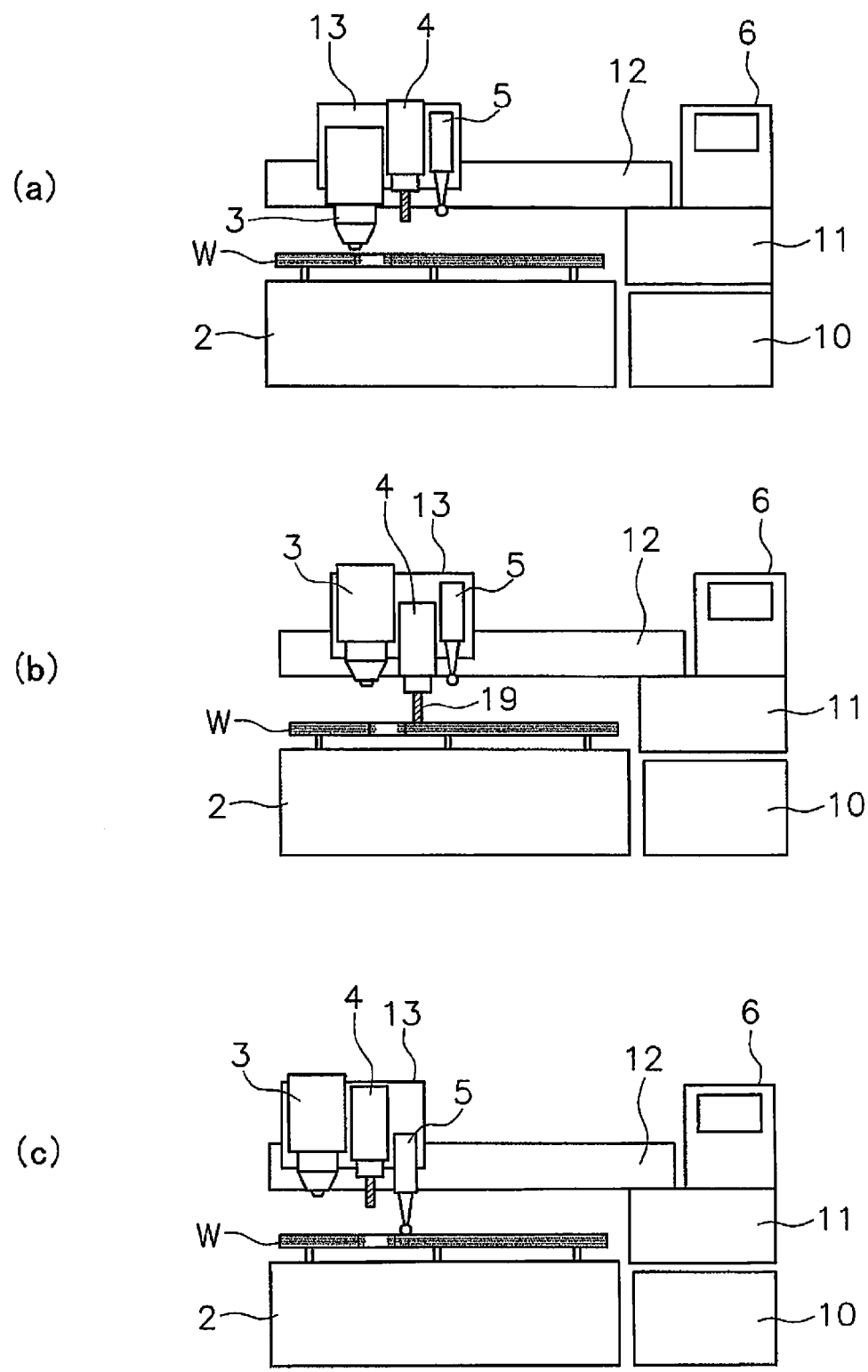
FIG. 5A illustrates a disposition of components during combined machining.
Figure 5B:
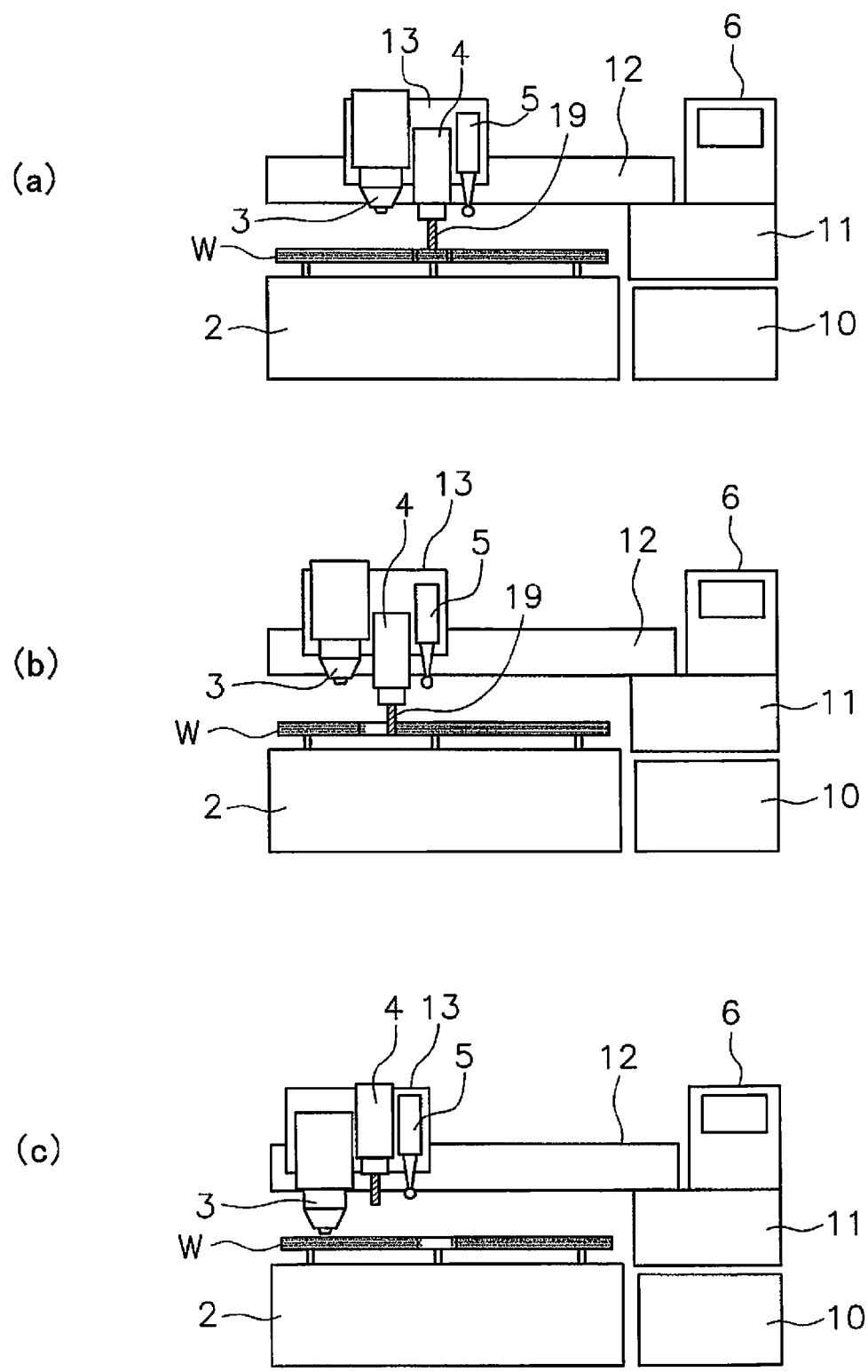
FIG. 5B illustrates a disposition of components during combined machining.

The machining method executed by the above combined machining device 1 will be explained with reference to FIGS. 4, 5A and 5B. Procedures of the machining method are illustrated in FIG. 4 and the arrangements of each of the components in the steps are illustrated in FIGS. 5A and 5B.

Machining can be performed in the following order when taking out a plurality of cut members from the original sheet W0.

Processes of hole cutting » finishing » outer periphery-cutting are implemented in order for each cut member.

The processes of hole cutting » finishing are implemented altogether on the plurality of cut members, and next the outer periphery-cutting is implemented altogether on the plurality of cut members.

After the hole cutting is repeated and the finishing machining is repeated, the outer periphery-cutting is implemented altogether.

As can be seen from the above methods, the outer periphery-cutting process is necessarily implemented after the finishing process. That is, the point in time for implementing the finishing machining is before the outer periphery-cutting, and the cut members need to be integrated with the original sheet.

Accordingly, an example of taking out one cut member having one hole from the original sheet W0 will be explained herein.

Figure 6:
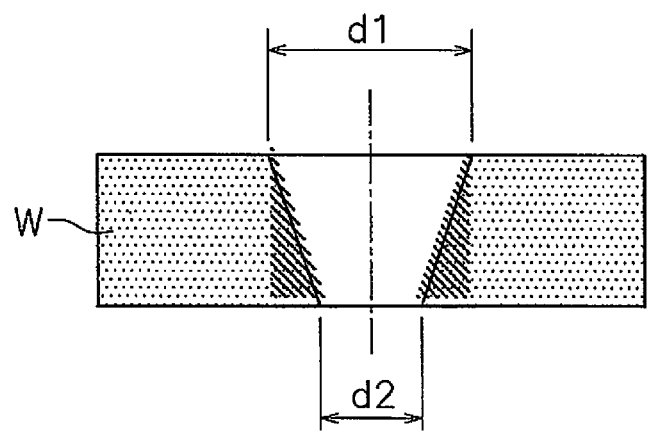
FIG. 6 is a cross-sectional view for explaining a hole shape due to plasma cutting.

First in step S1, the plasma torch 3 is activated and cutting machining of the hole in the original sheet W0 is performed (see FIG. 5A (a)). When performing hole cutting by plasma cutting, the formed hole takes on a reverse truncated cone shape as illustrated in FIG. 6. That is, a hole diameter d1 on the front surface side of the original sheet in contact with the plasma arc is larger than a hole diameter d2 on the rear surface side.

Accordingly, the hole diameter d1 on the front surface side of the original sheet formed by the hole cutting is set to be the approximate finished size in the hole cutting in step S1. That is, in the hole cutting in subsequent steps, a target size is set in the hole cutting so that a machining allowance is present on the front surface side of the original sheet and the machining allowance is minimized. In FIG. 6, the portion cut in the cutting machining is depicted by diagonal lines.

Next in step S2, the height position of the front surface of the original sheet W0 is measured. Specifically, the measuring is performed by either of the following two methods.

In a first measuring method, the distal end of the end mill 19 is allowed to make contact with the front surface of the original sheet W0 and the height (distal end position) of the end mill 19 in this state is detected (see FIG. 5A (b)). The data obtained from this process and the plate thickness data of the original sheet W0 acquired beforehand are used to derive the height position of the front surface of the original sheet W0.

In a second measuring method, the height of the front surface of the original sheet W0 is measured by the height detection sensor 5 when the protruding length of the end mill 19 from the machining head 4 is known beforehand (see FIG. 5A (c)). Then the height of the front surface of the original sheet W0 is derived from the data obtained by the measuring, from the protruding length of the end mill, and from the plate thickness data of the original sheet W0.

The position where the end mill 19 or the height detection sensor 5 makes contact with the original sheet W0 is near the hole formed in step S1.

The first measuring method described above has the merit that because the end mill 19 makes contact with the original sheet W0 and the front surface position of the original sheet W0 is detected by means of a reaction force thereof or electrical conduction, no special sensor is required and the configuration is simple.

Conversely, the second measuring method described above has the merit that the detection speed is faster and the detection accuracy is higher because a sensor used especially for height detection is provided.

According to the above processing, it is possible to know whether the distal end of the end mill 19 reaches the same height as the rear surface of the original sheet W0 when the end mill 19 is lowered by a certain amount. That is, because the plate thickness data of the original sheet W0 is acquired by the controller 6 beforehand, the distal end of the end mill 19 and the rear surface position of the original sheet W0 are matched by lowering the end mill 19 from the detected position by the amount of the plate thickness based on the plate thickness data and the detected distal end position of the end mill 19.

Accordingly, the lowering amount of the end mill 19 is set to the plate thickness of the original sheet W0+α. Herein, "α" is set to a value so that dross or a crosspiece of the loading table is not cut and so that no incomplete cutting of the hole inner peripheral surface remains.

In this case, a jig and a workpiece are loaded and machined on a surface plate in a machining apparatus having only the machining head. The height position of the front surface of the surface plate is acquired beforehand by the controller. Therefore, measurements of the height position of the front surface of the original sheet and calculation of the lowering amount as described above are not necessary in a machining apparatus having only the machining head.

The thickness of the original sheet W0 and the height positions of the crosspieces 7 on the loading table 2 are acquired as preliminary data by the controller 6 in the combined machining apparatus subject to the present invention. Therefore, cutting machining in subsequent steps can be performed on the basis of the data without measuring the front surface of the original sheet W0.

Figure 7:
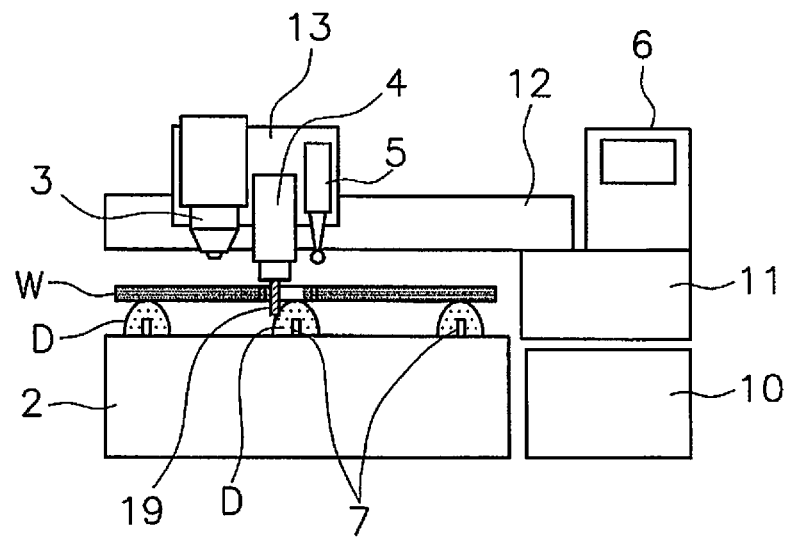
FIG. 7 is a view for explaining an action for detecting the height position of an original sheet.
Figure 7:
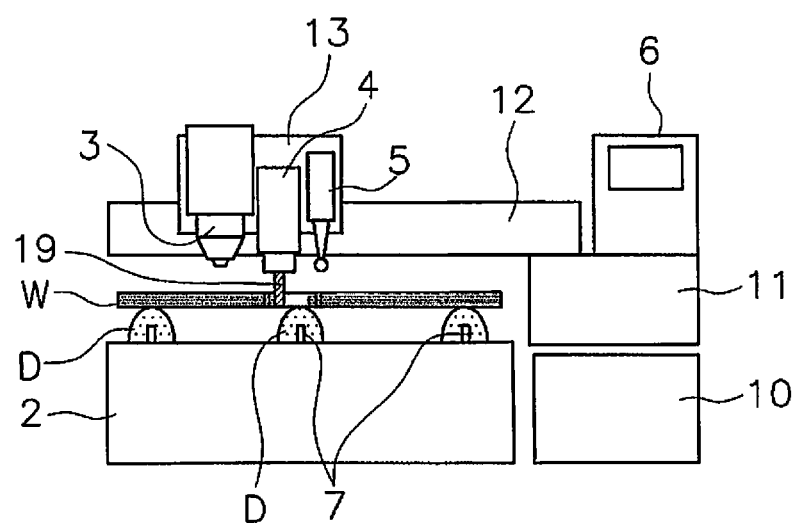

However, the height of the original sheet W0 loaded on the loading table 2 is not uniform due to dross D attached to the crosspieces 7 of the table 2 and due to warping of the original sheet W0 in a device for performing thermal cutting that includes plasma cutting as illustrated in FIG. 7. Moreover, the height of the upper surface of the crosspieces 7 may have a variation of several millimeters because the crosspieces 7 of the table 2 are consumable goods.

Under these conditions, the distal end of the end mill 19 may penetrate the original sheet W0 and reach the dross D or the crosspiece 7 as illustrated in FIG. 7(*a*) when machining the inner peripheral surface of the hole formed in the original sheet W0 on the basis of the previously obtained data as mentioned above. In this way, vibration when machining increases and damage to the end mill 19 may occur when cutting the crosspiece 7 or the dross D.

Accordingly in step S2, the actual height of the original sheet W0, in particular the height of the original sheet W0 near the formed hole, is measured and the movement of the end mill 19 is controlled in a subsequent process on the basis of the measuring result. This process is crucial in the combined machining apparatus subject to the invention of the present application. As illustrated in FIG. 7(*b*), the finishing machining can be performed without cutting the dross or the crosspiece and without incomplete cutting on the inner peripheral surface of the hole due to the above processing.

Next in step S3, a confirmation is made as to whether any end material remains inside the hole formed in step S1. That is, normally end material from the inside part of the hole falls down from a gap between the crosspieces 7 in the loading table 2 when performing hole cutting in step S1. However, in some cases, the end material may be caught on an end surface of the hole and may remain inside the hole.

Accordingly, in step S3, a confirmation is made as to whether or not any end material remains inside the hole. Specifically, processing to insert the end mill 19 into the hole is executed. As illustrated in FIG. 5B (a), the distal end of the end mill 19 hits the end material and cannot be lowered when end material remains inside the hole. By detecting the position of the end mill 19, the presence of end material inside the hole can be detected.

If the presence of end material inside the hole is confirmed, the routine advances from step S3 to step S4. The machining processing is stopped temporarily in step S4. A warning, such as a flashing light, is issued to an operator. The operator removes the end material and issues a command to restart the machining processing.

If no end material is present inside the hole or when the end material is removed, the routine advances to step S5. In step S5, cutting machining (finishing machining) is performed with the end mill 19. Specifically, the inner periphery end surface of the hole depicted by the diagonal lines in FIG. 6 is cut with the end mill 19 (see FIG. 5B (b)).

Figure 8:
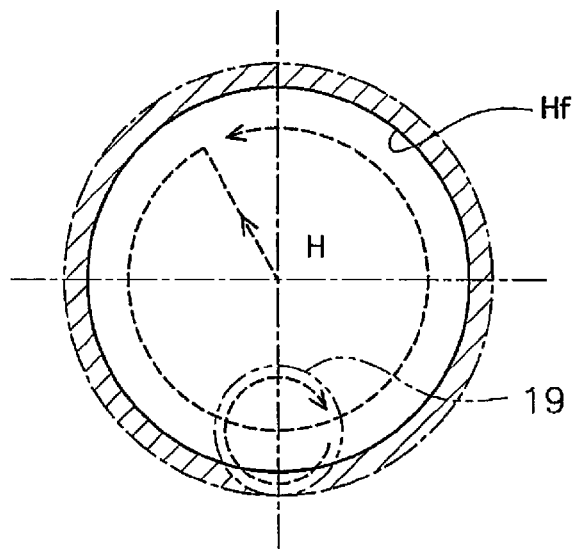
FIG. 8 is a schematic plan view of a finishing process.

FIG. 8 is a plan view of a thermally-cut end surface Hf of the hole H when performing cutting machining with the end mill 19. In the finishing machining, the end mill 19 is first inserted into the hole H. The end mill 19 is guided along the thermally-cut end surface Hf which is the inner peripheral surface of the hole H as indicated by the dashed line arrows and cuts the thermally-cut end surface Hf to machine the hole H to the finished size.

Figure 9:
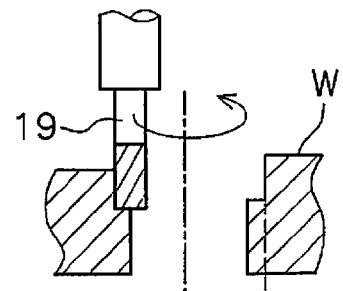
FIG. 9 is a cross-sectional view of an example when machining a plurality of times in the axial direction during the finishing process.
Figure 9:
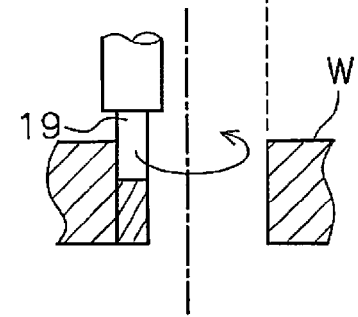
Figure 10:
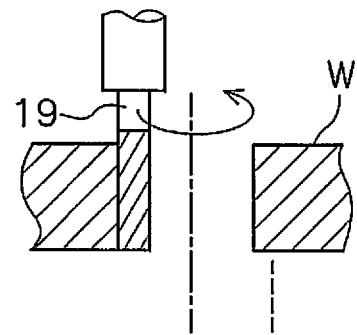
FIG. 10 is a cross-sectional view of an example when machining a plurality of times in the radial direction during the finishing process.
Figure 10:
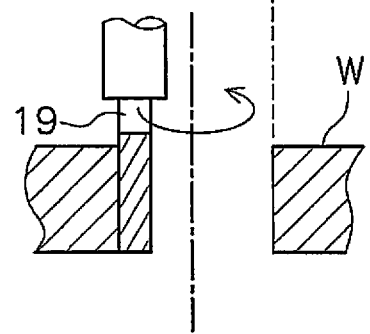

To prevent a reduction in efficiency, the load on the motor (using the air motor as described above) for driving the end mill 19 is preferably reduced to reduce the cutting speed in the finishing machining. Due to the machining allowance, the machining is preferably divided into a plurality of steps in the axial direction as illustrated in FIGS. 9(a) and (b), or the machining is divided into a plurality of steps in the radial direction as illustrated in FIGS. 10(a) and (b). In these cases, the end mill 19 is guided around a plurality of times.

Figure 11:
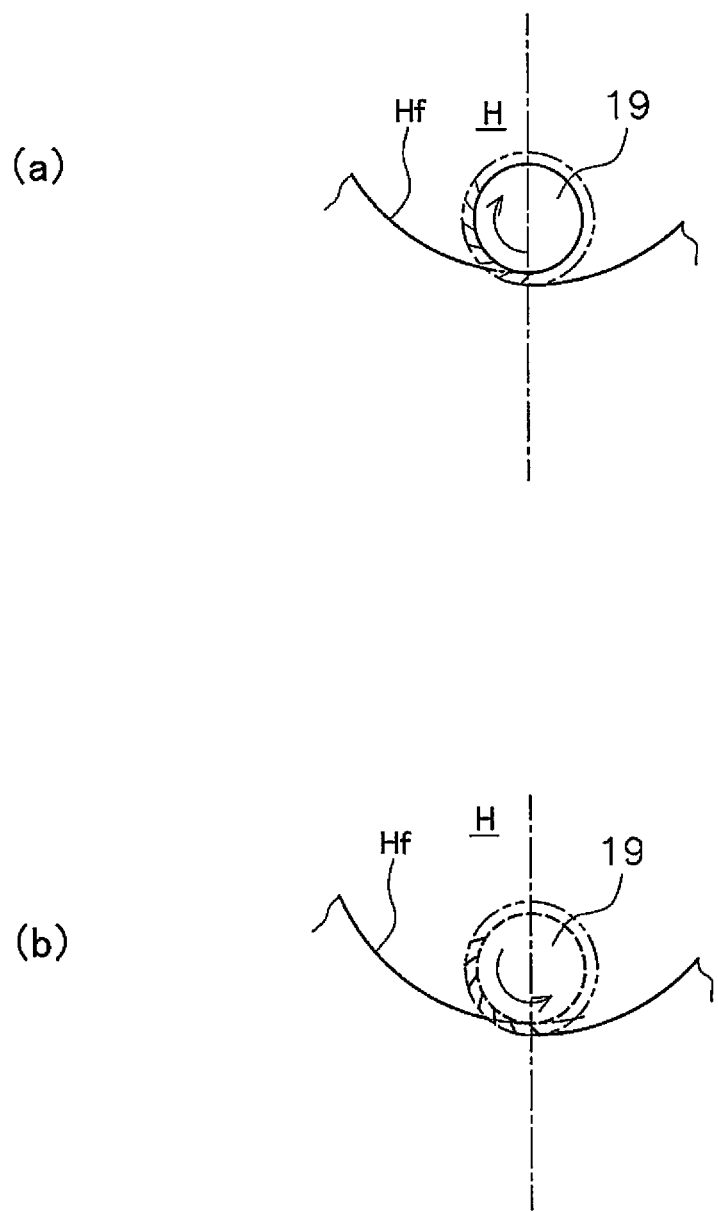
FIG. 11 is a plan view for explaining up-cutting and down-cutting in the finishing process.

The cutting machining performed with the end mill 19 involves up-cutting as illustrated in FIG. 11(a) and down-cutting as illustrated in FIG. 11(b). Up-cutting involves causing the edge of the tool to come up against the cut portion and cutting upward. Down-cutting involves causing the edge of the tool to come up against the uncut portion and cutting downward. In comparing the two types of cuttings, the cutting surface from the down-cutting is rougher but the feed speed is higher. Moreover, at the same feed speed, the reaction force when using the down-cutting is small and the original sheet W0 does not move very easily.

Based on the above reason, the machining is performed with down-cutting when finishing machining the hole H with the end mill 19 in the present exemplary embodiment.

Here, the height position of the original sheet W0 may change due to dross D attached to the crosspieces 7 of the loading table 2. However, due to the previous processing in step S2, the end mill 19 can be lowered precisely to the same position as the rear surface of the original sheet W0. Therefore, the entire region of the inner periphery end surface of the hole can be cut accurately. Moreover, cutting of the dross D or a crosspiece 7 by the end mill 19 can be prevented due to the same reasons.

In the reverse of the above situation, the height position of the original sheet W0 may drop down when wear on the crosspieces 7 occurs due to the plasma cutting. In this case, if the height of the front surface of the original sheet W0 cannot be detected, the distal end position of the end mill 19 would not reach the rear surface of the original sheet W0 and incomplete cutting may occur. However, this type of defect is prevented due to the previous processing in step S2.

Next in step S6, the plasma torch 3 is moved along the outer periphery of the cut member to cut the outer periphery of the cut member. As a result, the cut member having the hole formed therein can be taken out from the original sheet W0.

A small machining allowance remains during the formation of the hole by plasma cutting in the hole-cutting process, whereby a load during the cutting machining can be reduced in the finishing process. As a result, vibration during the cutting machining can be reduced, the stiffness of the frame can be reduced, and the motor for driving the end mill can be reduced in size. Moreover, the machining reaction force during machining is reduced and a clamping mechanism for holding down the original sheet is made unnecessary.

Vibration during machining can be limited and the machining reaction force can be reduced since the diameter of the end mill is made to be two times or less the thickness of the original sheet W0.

The height of the original sheet W0 near the hole is measured before the finishing machining, and the movement of the end mill is controlled on the basis of the measurement results and the plate thickness data of the original sheet W0. As a result, the inner peripheral surface of the hole can be cut precisely.

A confirmation is made as to whether any cut end material remains inside the hole from the hole-cutting process and finishing can be performed reliably and accurately since the finishing machining is performed. Moreover, because the confirmation is made by means of the end mill, a special sensor is unnecessary.

Movement of the original sheet W0 can be suppressed during the cutting machining since the end mill 19 is driven by an air motor. Movement of the original sheet W0 can be suppressed since a roughing end mill is used as the end mill 19 and the machining is performed by down-cutting.

The present invention is not limited to the above exemplary embodiments and various changes and modifications may be made without departing from the spirit of the invention.

While machining is temporarily interrupted and then is started after waiting for the removal of end material by the operator when end material is present inside the hole in the present exemplary embodiment, the end material may also be removed automatically.

The tool to be used for finishing machining is not limited to an end mill. Another cutting tool such as a grinder may be used.

The shape of the hole to be machined in not limited to a circular shape. For example, the present invention is applicable in the same way when the shape of the hole is a slot or a rectangle.

While the first Z-axis motor Mz1 for driving the plasma torch 3 and the second Z-axis motor Mz2 for driving the machining head 4 are provided in the present exemplary embodiment, the mechanism for moving the motors in the Z-axis direction is not limited to the present exemplary embodiment.

For example, the plasma torch 3 and the machining head 4 may be supported on a cart that is capable of moving in the Z-axis direction, and the cart may be driven in the Z-axis direction by one motor, and either the plasma torch 3 or the machining head 4 may be driven in the Z-axis direction with an air cylinder.

In this case, the plasma torch 3 is preferably driven with the air cylinder because the plasma torch 3 is less susceptible to bearing a reaction force during machining than the machining head 4.

While plasma cutting is used as the thermal cutting, the present invention can be applied in the same way for combined machining of the machining and thermal cutting that makes use of another cutting such as laser or gas cutting.

When forming a hole by means of a laser or gas, the diameter on the original sheet front surface side of the hole which is the laser irradiation side or the gas emission side tends to be smaller than the diameter of the rear surface side, which is the reverse of the tendency in plasma cutting.

Accordingly, when cutting the hole with a laser or with gas, the thermal cutting must be performed so that the machining allowance remains on the end part of the original sheet rear surface side of the hole. In this case, by making a target size on the rear surface side the approximate finishing size in the hole-cutting process, the cutting amount in the finishing machining can be greatly reduced.

According to the exemplary embodiment of the present invention, thermal cutting and machining to be performed especially on large original sheets is enabled by means of a simple and inexpensive combined machining device.

What is claimed is:

1. A combined machining method of forming a hole in an original sheet by thermal cutting and machining, and taking out a cut member including the hole from the original sheet, the method including:
    a hole-cutting process for forming a hole in the original sheet by means of thermal cutting while leaving a machining allowance relative to a finished size;
    a finishing process for using a cutting tool to cut a thermally-cut end surface of the hole by guiding the cutting tool along an inner peripheral surface of the hole, and to machine the hole to the finished size;
    an outer periphery-cutting process for cutting an outer periphery of the cut member by means of thermal cutting and taking out the cut member from the original sheet, the outer periphery-cutting process being executed after the finishing process; and
    a confirmation process for confirming whether or not thermally-cut end material remains inside the hole after the hole-cutting process by advancing the cutting tool toward the hole and detecting a position of the cutting tool, the confirmation processing being executed between the hole-cutting process and the finishing process.

2. The combined machining method according to claim 1, wherein
    the thermal cutting during the hole-cutting process and the outer periphery-cutting process is plasma cutting by generating a plasma arc on the front surface side of the original sheet; and
    the thermal cutting is performed by leaving a machining allowance on an original sheet front surface side end section of the hole in the hole-cutting process.

3. The combined machining method according to claim 1, wherein
    the thermal cutting during the hole-cutting process and the outer periphery-cutting process is laser cutting that irradiates a laser or gas cutting that emits a gas from the front surface of the original sheet; and
    the thermal cutting is performed by leaving a machining allowance on an original sheet rear surface side end section of the hole in the hole-cutting process.

4. The combined machining method according to claim 1, wherein
    machining is performed without clamping the original sheet from the hole-cutting process to the outer periphery-cutting process.

5. The combined machining method according to claim 1, wherein
    a rotating cutting tool is used for cutting the thermally-cut end surface of the hole in the finishing process; and
    a cutting tool diameter is two times or less than the thickness of the original sheet.

6. The combined machining method according to claim 1, further including
    a measuring process for measuring a height position of the hole as a previous process of the finishing process; and
    a height position of the cutting tool is controlled in the finishing process on the basis of measurement results from the measuring process and plate thickness data of the original sheet.

7. The combined machining method according to claim 1, wherein
    the confirmation process is performed by inserting the cutting tool used in the finishing process into the hole.

8. The combined machining method according to claim 1, wherein
    the thermally-cut end surface of the hole formed in the hole-cutting process is cut by an end mill in the finishing process.

9. The combined machining method according to claim 1, wherein
    the rotating cutting tool is driven with an air motor in the finishing process.

10. A combined machining device for forming a hole in an original sheet by thermal cutting and machining, and taking out a cut member including the hole from the original sheet, the device comprising:
    a loading table on which an original sheet is loaded;
    a first head for performing thermal cutting on the original sheet loaded on the loading table;
    a second head for performing machining on the original sheet loaded on the loading table, the second head having a cutting tool;
    a movement mechanism for moving the first and second heads in the horizontal direction and in the vertical direction relative to the loading table;
    a height position detection sensor for detecting a position in the vertical direction of the original sheet loaded on the loading table; and
    a control unit for controlling relative movement of the first and second heads relative to the loading table, and for controlling thermal cutting and machining performed by the first and second heads;
    wherein, the control unit has
    a hole-cutting functional unit for controlling the first head to form a hole in the original sheet by means of thermal cutting while leaving a machining allowance relative to the finished size of the hole;

a finishing functional unit for controlling the cutting tool of the second head to cut a thermally-cut end surface of the hole by guiding the cutting tool along an inner peripheral surface of the hole, and to machine the hole to the finished size;

an outer periphery-cutting functional unit for cutting an outer periphery of the cut member by thermal cutting and taking out the cut member from the original sheet, the outer periphery-cutting functional unit being programmed to execute cutting of the outer periphery after the finishing functional unit has completed machining the hole to the finished size; and a confirmation functional unit for confirming whether or not thermally-cut end material is remaining inside the hole by advancing the cutting tool toward the hole and detecting a position of the cutting tool, the confirmation functional unit being programed to execute the confirmation after the hole-cutting functional unit has formed the hole and before the finishing functional unit machines the hole to the finished size.

11. The combined machining device according to claim 10, wherein a second head has a cutting tool having a diameter that is two times or less than the thickness of the original sheet.

12. The combined machining device according to claim 10, wherein the control unit confirms the presence of the end material by inserting a cutting tool attached to the second head into the hole.

13. The combined machining device according to claim 10, wherein an end mill is attached to the second head.

14. The combined machining device according to claim 10, wherein the second head has an air motor for driving the cutting tool.

* * * * *